April 3, 1962 R. O. STOEHR 3,028,573

CROSS-CONNECTING BOARD

Filed May 1, 1959

INVENTOR.
Rudolph O. Stoehr

BY C. A. Gulbrandsen

Atty.

United States Patent Office 3,028,573

Patented Apr. 3, 1962

3,028,573

CROSS-CONNECTING BOARD

Rudolph O. Stoehr, Des Plaines, Ill., assignor to Automatic Electric Laboratories, Inc., a corporation of Delaware Filed May 1, 1959, Ser. No. 810,428
2 Claims. (Cl. 339—17)

The present invention pertains to electrical wiring and particularly to a printed wiring cross-connecting board for selective interconnection of a plurality of circuits.

In the use of control or test circuits, it is often necessary and is usually desirable to be able to selectively interconnect each branch of a first circuit with two or more branches of a second circuit. One important use of this type of connection is in central office equipment of a telephone system where individual lines are bunched to party line busses or trunks. Another use of selectively interchangeable circuit connections is in test circuits where branches of a circuit can be tested in conjunction with a variety of conditions on other circuits by varying the connection. In programming, a plurality of cross-connecting boards as disclosed in this specification can be permanently connected and selectively jacked into the circuits to be controlled.

Accordingly, it is the primary object of this invention to provide cross-connecting boards having a plurality of independent conducting paths formed thereon adapted to be selectively interconnected at their projected intersections.

A further object of this invention is to provide a cross-connecting unit with a plurality of conducting paths distributed between two or more planes and means for selectively interconnecting the paths in one plane with those in another.

A further object of this invention is to provide a cross-connecting board having a plurality of conducting paths connected in a predetermined pattern, each board being adapted to be jacked into a predetermined circuit.

These and other objects of the present invention will be apparent to one skilled in the art from the reading of the following detailed description when taken in conjunction with the drawings wherein.

Figure 2:
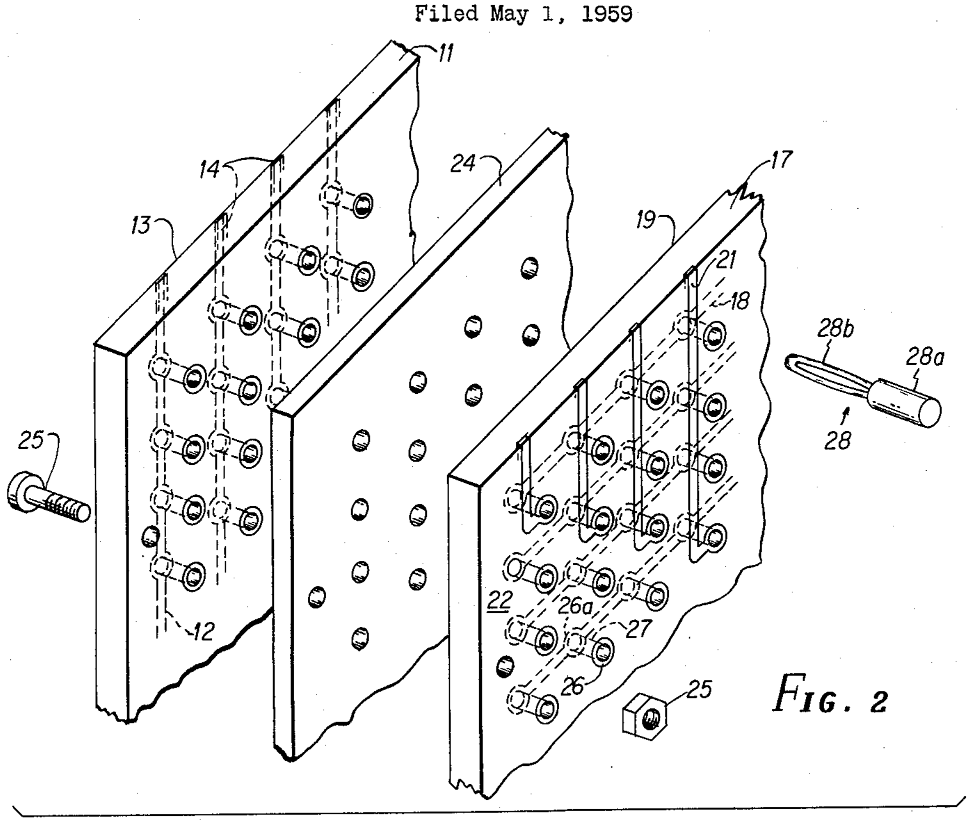
FIG. 2 is an exploded partial perspective view of the cross-connecting board of this invention.
Figure 1:
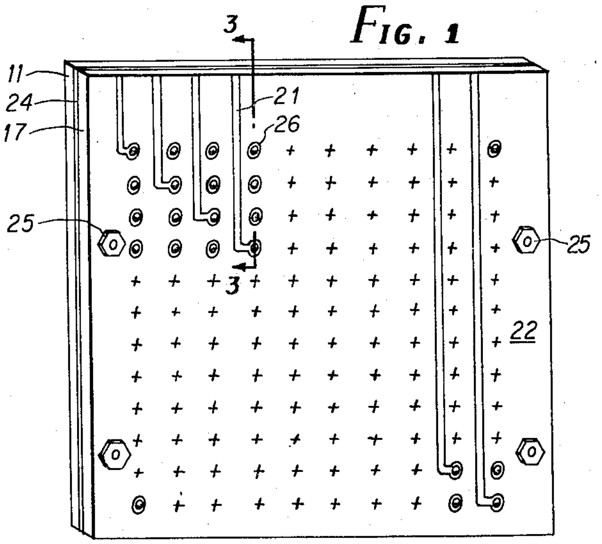
FIG. 1 is a perspective view of a cross-connecting board of this invention.
Figure 3:
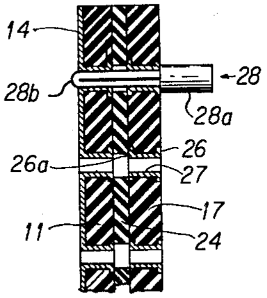
FIG. 3 is a sectional view taken along the line 3—3 in FIG. 2.

In general, the present invention comprises a plurality of conducting paths disposed in a predetermined number of insulated parallel planes and means for selectively connecting the conducting paths in one plane with one or more of the conducting paths of the other plane or planes at their points of projected intersection. The projected intersection is the intersection of a plane perpendicular to the panel surface and containing a first conducting path with a second conductor path in a panel surface remote from that containing the first conductor path.

Conducting paths are formed in one surface of a sheet of insulating material and have junction points formed by plated-through holes at predetermined intervals. The boards carrying the conductor are assembled in a parallel arrangement and insulated one from the other by an air gap or some solid insulating material. The plated-through holes forming the junction points of the various conducting paths are aligned in assembly to serve as female receptacles for male connectors which are passed through the holes and are electrically connected therewith to form a conducting path from one plane to another. Where solid insulators are used, a passageway must be provided therethrough at the points of projected intersection of the conducting paths to be connected.

Referring now to the drawings, a cross-connecting board for use in a telephone system is illustrated. A vertical conducting board 11 has one hundred vertical conducting paths 12 formed on its surface 13 by any suitable printed wiring technique. The vertical conducting paths are each connected at a terminal tab 14 to a telephone line (not shown) through a suitable terminal clip. A second board 17 has ten horizontal conducting paths 18 formed on one surface 19. The horizontal conducting paths 18 are electrically connected to terminal tabs 21 on the opposite surface 22 of the board 17 from the surface carrying the conducting paths. The tabs 21 are adapted to be connected to party line equipment. The horizontal conducting board 17 and the vertical conducting board 11 are mechanically secured together by a fastening means 25 with the planes of their conducting paths substantially parallel, and are insulated one from another by an insulating board 24 which is secured therebetween by the fasteners 25 to form a unitary cross-connecting board.

Each panel has an aperture therethrough at the projected point of intersection of the horizontal and the vertical conducting paths 12 and 18. The aperture in each of the conductors is surrounded on each surface of the panel by flush ring 26 of conducting material, the two flush rings being electrically connected by a cylindrical sleeve of conducting material 27 plated along the walls of the aperture. The flush rings on the conducting surfaces 13 and 19 are electrically connected to the conducting paths 12 and 18 respectively to form connecting receptacles for a removable connector 28.

By this construction, the cross-connecting board is so arranged that any conducting path in the plane 13 may be connected with any conducting path in the plane 22 by the simple expedient of inserting the connector 28 in the passageway formed at any one of the points of projected intersection.

The connecting means 28 comprises a core with an insulating portion 28*a* formed on one end and an outwardly biased spring of conducting material 28*b* formed on the other end. The probe thus formed can be inserted through any of the apertures at the projected intersections of the circuits in two or more different planes. Because of the outward tension of the spring material 28*b*, the material is urged against the sleeve 27 to form a good electrical contact. The apertures in the insulating plate 24, being not plated but being of nonconducting material, do not form an electrical connection with the probe 28 so that the probe is the sole conductor between the board 11 and the board 17 when inserted into one of the apertures at the projected intersection of the conducting paths on the two boards.

The plated-through construction of the apertures in the circuit is formed with a first flush ring such as 26 formed on the side of the board opposite the surface carrying the conducting path and a second flush ring such as 26*a* formed on the side with the conducting path and is interconnected by the cylindrical sleeve 27 to anchor the conducting material against physical dislodgements. The flush rings 26 serve the further purpose of connecting the plating material in the aperture with the terminal tab of 21 while the flush rings 26*a* serve the obvious purpose of connecting the aperture to the conducting path on the surface 19. Both boards are similarly constructed and assembled by means of a fastening means 25 to form the unitary cross-connecting board of this invention.

While the present invention has been described in a specific embodiment, it should be understood that various changes may be made therein without departure from the spirit and scope thereof.

What is claimed is:

1. A cross-connecting device comprising: a plurality of printed circuit boards positioned in stacked relationship; a group of column conductors printed on a surface of one of said boards and terminating in a corresponding group of connecting tabs disposed along one edge of said board; a group of conductors in parallel rows angularly related to the said column conductors and printed on a surface of another of said boards; a group of terminal conductors printed on the other surface of said other board and extending parallel with said column conductors; sleeves of conductive material extending through apertures in each of said boards at the projected intersections of said columns and rows, each of the sleeves in said other board being connected at one end to one of said row conductors and one sleeve in each row being connected at the other end to one of said terminal conductors, and said terminal conductors terminating in a second group of connecting tabs disposed along the corresponding edge of said other board, whereby the plugging in and out of said device is facilitated; and a bridging element of conducting material adapted to be selectively inserted in corresponding sleeves of said two boards for selectively cross-connecting a tab of said first and said second group.

2. A cross-connecting device comprising, in stacked relationship, a first and second printed circuit board and an insulating board therebetween; said first board having a group of column conductors printed on the surface thereof; said second board having printed on one surface thereof a group of conductors in parallel rows angularly related to the said column conductors and on the other surface thereof a group of terminal conductors, said terminal conductors extending substantially parallel to said column conductors; a matrix of apertures extending through said stack at the projected intersections of columns and rows, the apertures of each of said printed circuit boards having printed sleeve conductors; said sleeve conductors in said first board being connected to said column conductors and said sleeve conductors in said second board being connected at one end to one of said row conductors and one sleeve conductor in each row being connected at the other end to one of said terminal conductors; said column conductors terminating in a first group of connecting tabs disposed along one edge of said stack and said terminal conductors terminating in a second group of connecting tabs disposed along said edge, whereby the plugging in and out of said device is facilitated; and a bridging element of conducting material adapted to be selectively inserted in corresponding apertures of said stack for selectively cross-connecting a tab of said first and said second group by way of said sleeve conductors.

References Cited in the file of this patent

UNITED STATES PATENTS

| | | |
|---|---|---|
| 664,557 | Jones | Dec. 25, 1900 |
| 840,537 | Weir | Jan. 8, 1907 |
| 2,512,820 | Bader | June 27, 1950 |
| 2,889,532 | Slack | June 2, 1959 |

FOREIGN PATENTS

| | | |
|---|---|---|
| 70,102 | France (Addition.) | Oct. 13, 1958 |